United States Patent [19]

Huyssen

[11] 4,094,096
[45] June 13, 1978

[54] FLOWER HOLDER

[76] Inventor: Phillip H. Huyssen, 407 Lakeland Dr., Hot Springs, Ark. 71901

[21] Appl. No.: 803,230

[22] Filed: Jun. 3, 1977

[51] Int. Cl.² ............................................. A01G 5/00
[52] U.S. Cl. ................................................ 47/41.13
[58] Field of Search ............... 47/41 R, 41 G, 41 SS, 47/41.1, 41.11, 41.12, 41.13; 206/423, 476, 486, 487

[56] References Cited

U.S. PATENT DOCUMENTS

| 131,141 | 9/1872 | Will | 47/41 X |
|---|---|---|---|
| 664,837 | 1/1901 | Davis, Jr. | 47/41 X |
| 894,203 | 7/1908 | Harvey | 47/41.13 |
| 1,736,526 | 11/1929 | Friedman | 206/423 |
| 2,746,208 | 5/1966 | Lewis | 47/41 |
| 3,169,897 | 2/1965 | Yue | 47/41 |
| 3,177,617 | 4/1965 | Woistinen | 206/423 X |

FOREIGN PATENT DOCUMENTS 823,767   11/1959   United Kingdom ............... 47/41.13

Primary Examiner—E. H. Eickholt
Attorney, Agent, or Firm—Tilton, Fallon, Lungmus & Chestnut

[57] ABSTRACT

A flower holder particularly suitable for graveside use which is easily installed and which provides reliable support for a spray of flowers even in inclement weather. The holder includes a standard having vertically-spaced lower and upper loops and having a beveled lower end portion removably received in a mounting tube. The mounting tube is adapted to be driven into the ground and is provided with an internal bevel corresponding to the bevel of the holder's lower end portion to restrain independent relative rotation of the holder. The holder is also provided with a beveled upper end portion received in a coupling sleeve which rests upon the upper loop and which removably retains a beveled shaft for supporting a suitable adornment.

8 Claims, 5 Drawing Figures

U.S. Patent   June 13, 1978   4,094,096
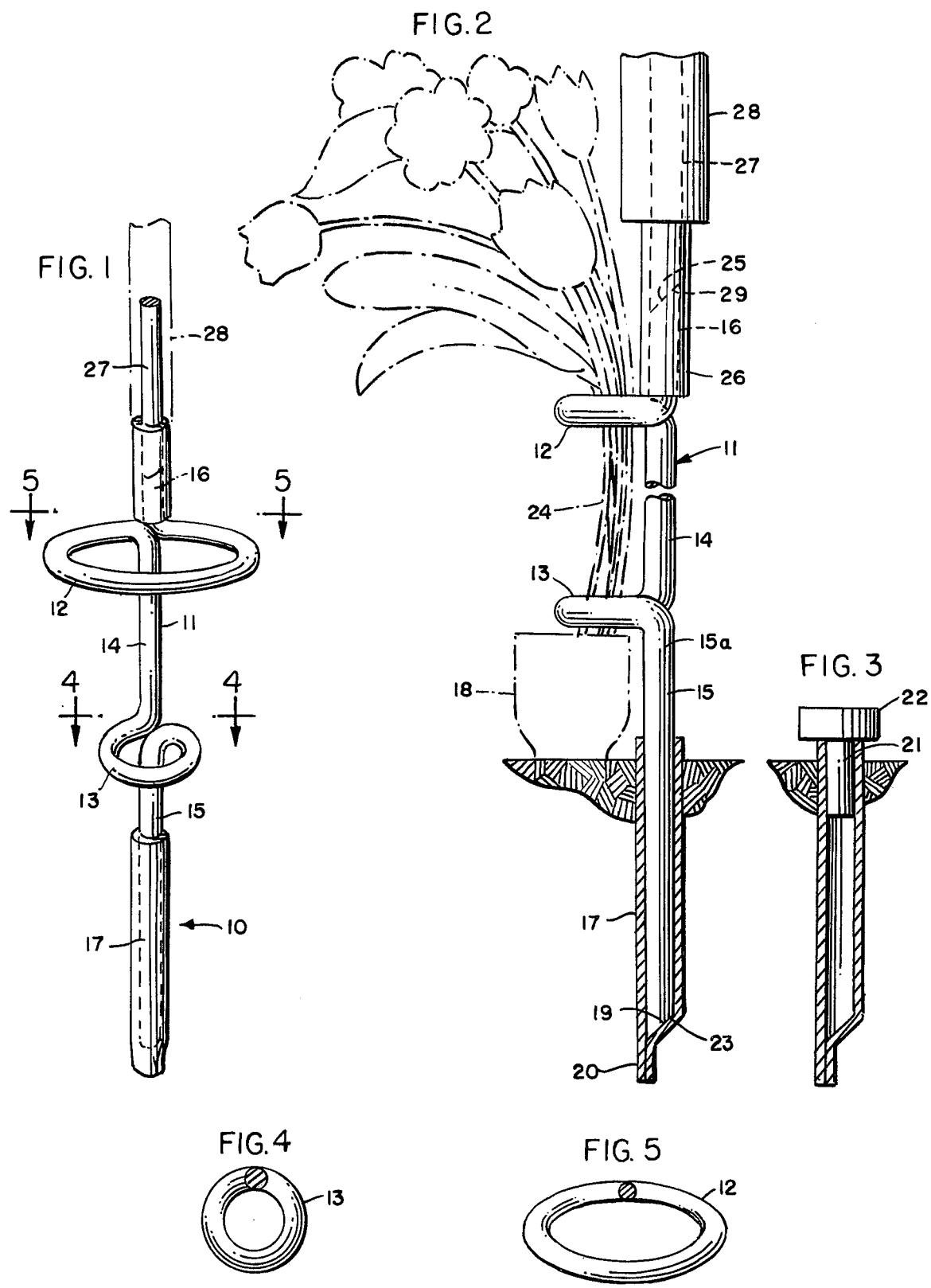

FLOWER HOLDER

BACKGROUND AND SUMMARY

Flower holders for graveside use should be durable, relatively inexpensive, and capable of supporting flowers, either fresh or artificial, under windy conditions and over a wide range of temperatures. Conventional holders are often elaborate and expensive, factors which contribute in discouraging use. Flowers placed at a graveside without some form of holder are easily scattered by the wind and, in any case, quickly lose their attractive and decorative appearance. Even when a conventional holder is used there is a likelihood that adverse weather conditions will cause the holder to tip and release the flowers which it is designed to hold.

This invention is therefore concerned with a flower holder which is particularly suitable for graveside use and which is durable, easily installed, and relatively inexpensive. When properly installed, the holder is fixed in position against rotation and against dislodgment under even severe wind conditions. The flowers which it holds are similarly supported to resist displacement by the wind and yet are easily inserted into the holder or removed at will from that holder. A suitable adornment, such as a cross, a plaque, or a sculpture of selected design, may also be removably mounted upon the holder and, when so mounted, is secure against wind displacement.

The holder includes a standard in the form of a heavy metal rod which extends vertically and which is provided with a pair of integral, vertically-spaced loops. The rod has a lower end portion extending downwardly below the lower loop and terminating in a beveled end face. The lower end portion is slidably received in a mounting tube which is adapted to be driven into the ground and which has a beveled inner surface at its lower end for engaging the beveled surface of the rod to restrain independent rotation of the rod.

The rod also includes an upper end portion which projects upwardly from the upper loop. That upper end portion may be received in a coupling sleeve in the event that the holder is to be used for supporting an adornment such as, for example, a cross. In that event, the adornment includes a downwardly-extending shaft dimensioned to be received in the open upper end of the sleeve. The lower end of the shaft is beveled to mate with the angular face of the upper end portion of the holder.

Other features, advantages and objects of the invention will become apparent from the specification and drawings.

DRAWINGS

FIG. 1 is a perspective view of a holder embodying the invention.

FIG. 2 is an enlarged side elevational view of the holder, the lower end of the holder being received in a mounting tube which is shown in section to illustrate the relationship of parts.

FIG. 3 is a vertical sectional view of the mounting tube showing an impact element fitted into the open upper end of the tube for the purpose of driving the tube into the ground.

FIG. 4 is a horizontal sectional view taken along line 4—4 of FIG. 1.

FIG. 5 is a horizontal sectional view taken along line 5—5 of FIG. 1.

DETAILED DESCRIPTION

Referring to the drawings, the numeral 10 generally designates a flower holder comprising a standard 11 having vertically-spaced upper and lower loops 12 and 13, a vertical intermediate portion 14, a depending lower portion 15 projecting downwardly beneath loop 13, and an upstanding upper portion 16. In the embodiment illustrated, the standard is formed from a single rod of steel or other metal, the upper and lower loops 12 and 13 therefore being formed integrally with the remaining portions of the standard. Upper loop 12 is laterally elongated so that when the standard is viewed from the front the upper loop has a horizontal dimension substantially larger than lower loop 13. It will be observed from FIG. 2, however, that the front-rear dimensions of the two loops are substantially the same. In plan view, the lower loop has a generally circular outline (FIG. 4) whereas the upper loop is oval or elliptical in configuration.

The lower portion 15 of the standard is received within the open upper end of a mounting tube 17, the mounting tube being substantially shorter than the lower portion 15 so that when the parts are assembled as shown in FIGS. 1 and 2 a substantial length of portion 15 directly below lower loop 13 remains exposed. The exposed portion, designated by numeral 15a in the drawings, is at least four inches in length so that a suitable vessel 18 may be placed on the ground beneath loop 13 as shown.

The lower end of the mounting tube is closed to provide an angled bottom wall 19. Preferably, the tube is crimped or formed in such a manner that the lower end of the tube includes a tip 20 to facilitate inserting the mounting tube into the ground. Such insertion is also aided by a plug 21 having an enlarged head 22 which may be struck with a hammer or other tool to drive the mounting tube into the ground without at the same time damaging the open upper end of that tube. After the tube has been inserted so that its open upper end is flush with the ground, or projects only slightly above the ground surface as shown, plug 21 is removed and the lower end portion of the standard may then be inserted.

Plug 21 may also be used as a protective device when the flower holder is not in use. Thus, if the flower holder is to be removed from the tube for an extended period, plug 21 may be used to close the opening of the tube and prevent stones, dirt, or particulate matter from entering the tube. Similarly, during a grass cutting operation, it may be desirable to remove the standard and replace it with plug 21 so that clippings and other material do not enter the mounting tube. Since the mounting tube projects only a short distance above ground level, and since the head portion 22 of the plug is of limited height, a mower may easily pass over both the tube and the plug without contacting either of them.

The lower end portion 15 of the standard has a beveled lower end face 23 which slopes at an angle matching the angle of end wall 19 of the mounting tube. As a result, when the standard is inserted into the mounting tube as shown in FIG. 2, the matching slopes of wall 19 and end face 23 orient the standard and restrain rotation of that standard with respect to the tube. It has been found that even under severe wind conditions, with the standard used to support flowers 24 as generally indicated in FIG. 2, the standard is effectively restrained from rotating within the mounting tube.

The upper end portion 16 of the standard terminates in an inclined or beveled end face 25 and, as shown most clearly in FIG. 2, the entire upper end portion is received within a connecting sleeve 26. The sleeve is substantially longer than the end portion 16, continuing well above the beveled end face 25. The lower end of the sleeve or tube rests on the upper loop 12, while the open upper end of the sleeve may receive the shaft 27 of a suitable adornment 28. The adornment may take the form of a cross, a plaque, or a piece of sculpture as, for example, a sculpture of praying hands. Since any of a wide variety of adornments may be selected, the details of such an adornment are not given here except to the extent that they relate specifically to the structure and operation of this invention. In that regard, the adornment should include shaft 27 as part of its construction, the shaft being securely fixed against movement relative to the adornment. The lower end of the shaft is provided with a beveled face 29 which has substantially the same slope as face 25 at the upper end of portion 16. Therefore, when the upper portion 16 and shaft 27 are both inserted into sleeve 26, faces 25 and 29 engage each other (FIG. 2) to restrain rotation of the adornment relative to the standard.

FIG. 2 depicts the flower holder supporting a spray 24 of flowers with the stems of the flowers passing through both the upper and lower loops 12 and 13. Vessel 18 is disposed beneath the lower loop to hold water; however, it is to be understood that vessel 18 may be omitted if desired. Similarly, if no adornment 28 is to be used, then if desired sleeve 26 may be removed from the upper end portion 16 of the standard.

While in the foregoing I have disclosed an embodiment of the invention in considerable detail for purposes of illustration, it will be understood by those skilled in the art that many of these details may be varied without departing from the spirit and scope of the invention.

I claim:

1. A flower holder comprising a standard having a pair of vertically-spaced loops for receiving the stems of flowers, said standard having a lower end portion projecting downwardly below said lower loop, and a mounting tube having a length substantially less than said lower end portion and slidably receiving said lower end portion, said lower end portion terminating in a beveled end face and said mounting tube having an angled lower end wall for engaging said end face and restraining rotation of said standard.

2. The holder of claim 1 in which said standard comprises a metal rod and said loops are formed integrally therewith.

3. The holder of claim 1 in which said upper loop is wider than said lower loop.

4. The holder of claim 1 in which said mounting tube is formed of metal and is provided with a narrow tip at its lower end.

5. The holder of claim 1 in which said standard also includes an upper end portion extending upwardly from said upper loop, said upper end portion terminating at its upper end in a beveled end face.

6. The holder of claim 5 in which a connecting sleeve slidably receives said upper end portion, said sleeve extending a substantial distance above said beveled end face of said upper end portion to define a socket for receiving the shaft of an adornment.

7. The holder of claim 6 in which the shaft of an adornment is received within the upper end of said connecting sleeve, said shaft having a beveled lower end face of a slope corresponding with the slope of the end face of the upper end portion of said standard.

8. The holder of claim 1 in which said standard is formed of a rod of circular cross-sectional configuration, said mounting tube having an interior of circular cross section snugly but slidably receiving said lower end portion of said standard.

* * * * *